United States Patent [19]
Weigert

[11] Patent Number: 5,327,473
[45] Date of Patent: Jul. 5, 1994

[54] TIME PERIOD CONFIGURABLE FLUID FLOW CONTROL CIRCUIT

[76] Inventor: Hans Weigert, 284 Franklin Tpk., Ridgewood, N.J. 07450

[21] Appl. No.: 969,425

[22] Filed: Oct. 30, 1992

[51] Int. Cl.$^5$ ............................................. G06M 3/02
[52] U.S. Cl. ...................................... 377/21; 377/20; 377/44; 137/624.11
[58] Field of Search ........................... 377/20, 44, 21; 137/624.11

[56] References Cited

U.S. PATENT DOCUMENTS

| | | | |
|---|---|---|---|
| 3,044,065 | 7/1962 | Barney et al. | 377/44 |
| 3,050,708 | 8/1962 | Van Alstyne et al. | 377/44 |
| 3,575,640 | 4/1971 | Ishikawa | 4/623 |
| 4,217,644 | 8/1980 | Kato et al. | 377/21 |
| 4,262,842 | 4/1981 | Grover et al. | 377/20 |
| 4,304,989 | 12/1981 | Vos et al. | 377/21 |
| 4,651,777 | 3/1987 | Hardman | 137/487.5 |
| 4,682,628 | 7/1987 | Hill | 137/624.11 |
| 4,823,414 | 4/1989 | Piersimoni et al. | 137/624.11 |
| 4,984,314 | 1/1991 | Weigert | 4/623 |

Primary Examiner—John S. Heyman
Attorney, Agent, or Firm—Klauber & Jackson

[57] ABSTRACT

A timing circuit 10 that can be used to control the flow of fluid according to a specific time period that is allotted for each user includes a initialization circuit 30, a reset counter circuit 32, a flow time counter circuit 38, and a clock circuit 40. The timing circuit 10 accepts a DETECT* input signal, that indicates the presence of a user, and provides a DRIVE output signal that indicates when fluid shall be permitted to flow. The flow time counter circuit 38 is user configurable to provide a maximum flow time period while the DETECT* signal is active. The reset counter circuit 32 ensures that each user is provided with his or her maximum flow time period by introducing a system reset time between consecutive users and by allowing a user to remove him or her self from being detected, thus placing the DETECT* signal in an inactive state and subsequently inactivating the DRIVE signal, for certain periods of time without forfeiting any of his or her allotted maximum flow time period. The initialization circuit 30 provides the user with an initial controlled time period of fluid flow, if desired.

18 Claims, 1 Drawing Sheet

TIME PERIOD CONFIGURABLE FLUID FLOW CONTROL CIRCUIT

BACKGROUND OF THE INVENTION

1. Field of the Invention

The present invention relates to electronic timing circuits and, more particularly, to an electronic timing circuit that can be used to control a time period of fluid flow in residential and commercial showers, and the like.

2. Description of the Prior Art

The use of electronic circuits to control fluid flow in showers, faucets, commodes, and urinals is well known in the art. For example, U.S. Pat. Nos. 3,575,640, 4,823,414, 4,682,628, 4,984,314, and 4,651,777 all address various methods of employing electronic circuitry for controlling the flow of fluids in at least one of the previously stated types of washroom related fixtures. A brief description of these prior art devices is now given.

Ishikawa, U.S. Pat. No. 3,575,640, discloses an automatic water supply system that includes a capacity sensitive antenna for detecting the presence of a user. With the presence of a user detected, the antenna produces an active valve actuator signal that controls an electromagnetic valve to turn on a flow of water into a sink or urinal. A timer circuit and a delay circuit are included to shut off the water flow after a predetermined period of time has elapsed. A compensating circuit is included to determine the presence of an actual user, as opposed to an inanimate object or other unwanted capacity affecting phenomenon, and thus allows further water flow after a time-out has occurred and a user is still present.

Piersimoni, U.S. Pat. No. 4,823,414, teaches an automatically controlled faucet system wherein a light source and light sensor are used to sense the presence of a user, or object, under a faucet. Electronic circuitry is used to turn on and turn off a flow of fluid from the faucet in response to the presence and non-presence of a user, respectively, and also to terminate the flow of fluid from the faucet after a predetermined period of time has elapsed. Further fluid flow from the faucet is allowed after a time-out has occurred by simply having the user, or object, exit the sensing area under the faucet and then subsequently reenter.

Hill, U.S. Pat. No. 4,682,628, discloses a faucet system that includes an LED and a photo-detector which act together to detect the presence of a user, or object, in the vicinity of a faucet. When a user is detected, a solenoid drive circuit is triggered thereby permitting a flow of water from the faucet. A timer circuit is triggered along with the solenoid drive circuit so as to limit the time period of water flow. The timer circuit also prevents the solenoid drive circuit from permitting further water flow from the faucet until the user, or object, exits from the detection vicinity and then subsequently reenters.

Hardman, U.S. Pat. No. 4,651,777, discloses a water supply control system that includes a microphonic circuit which responds to audio signals. The microphonic circuit converts these audio signals into electrical signals that control a solenoid driven water valve assembly. Thus, water flow is controlled by sounds generated by or related to a user.

Lastly, in U.S. Pat. No. 4,984,314, Weigert, the inventor of the present invention, teaches an automatic fluid-flow control system that is configurable to be used in conjunction with faucets, commodes, urinals, and showers. In all cases, a light emitting device cooperates with a light sensor to detect light reflected from a user. A filtered and amplified output signal from the sensor is demodulated to provide a DC output signal that is used to control the flow of fluid in a manner appropriate to the particular configuration. As with several of the previously described prior art devices, a timer circuit prevents the flow of fluid after a predetermined period of time has elapsed, and further fluid flow is obtained by having the user exit and then subsequently reenter the light reflecting region.

Although all of the above-mentioned prior art devices perform certain desired functions in the context of controlling the flow of fluids, none address the situation where a specific time period of fluid flow is allotted for each user. Such a situation is desirable for reasons of fluid conservation and of overall fairness when a number of users are present. It is therefore desirable to overcome the shortcomings of the above-mentioned prior art devices in this area, while providing a simple, low cost, reliable, and highly accurate circuit that can be used to control the flow of fluid according to a specific time period that is allotted for each user.

SUMMARY OF THE INVENTION

The present invention contemplates an electronic timing circuit that is configurable to control a specific time period of fluid flow for each of any number of users. Such a circuit is particularly useful in controlling a time period of water flow through a shower head that services a number of similar users. Such a circuit is also useful when only a limited amount of water, or other fluid, is available and a number of users are vying for an equal share. In either case, the present invention equitably accommodates each of the users with a simple, low cost, reliable, and highly accurate electronic timing circuit.

Specifically, the present invention timing circuit accepts an active DETECT* input signal that indicates the presence of a user, and provides an active DRIVE output signal that indicates when fluid shall be permitted to flow. The timing circuit also maintains a clock circuit, a reset binary-down counter circuit, a flow time binary-up counter circuit, and an initialization circuit that is manually invoked by the user at his or her option by applying pressure to a touch pad or similar electrical short circuiting device. The initialization circuit is generally provided for use in showers, where it is desirable that the user be allowed an initial controlled time period of water flow so that water temperature, and possibly water flow rate, may be adjusted.

The flow of fluid begins, or the active DRIVE output signal indicates when it shall be permitted to begin, when either a user is detected, as indicated by the active DETECT* input signal, or when the user manually invokes the initialization circuit. When either of these events occur, the DRIVE signal becomes active, the reset counter circuit is preloaded with a predetermined binary value, the clock circuit begins to operate at a predetermined periodic rate, and the flow time counter circuit begins counting in binary increments at the clock circuit periodic rate; in other words the timing circuit advances from an initial state to a first active state. From this first active state the timing circuit can advance to essentially two other states.

First, if either of the above-described events continue to occur, the DRIVE signal will remain active, and the flow time counter circuit will continue to count toward a user configurable maximum flow time period. It should be noted, however, that the initialization circuit is time limited to allow only an initial controlled time period of fluid flow, which is shorter than the user configurable maximum flow time period. Hence, only a continued occurrence, or a series of subsequent occurrences, of the manually invoked initialization circuit will enable the flow of fluid to be maintained until the user configurable maximum flow time period has been reached. Otherwise, only a continued occurrence of the active DETECT* signal, a subsequent occurrence of the active DETECT* signal, a series of subsequent occurrences of the active DETECT* signal, or an intermingling of the active DETECT* signal and the manually invoked initialization circuit will enable the flow of fluid to be maintained until the user configurable maximum time period has been reached.

Second, if both of the above-described events cease to occur after an initial occurrence of either, the DRIVE signal will become inactive, the reset counter circuit will begin counting in binary decrements at the clock circuit periodic rate, and the flow time counter circuit will stop counting and maintain its present count. Regardless of what began the initial sequence of events, if the DETECT* signal becomes active before the reset counter circuit decrements to zero, then the DRIVE signal will again become active, the reset counter circuit will again be preloaded with a predetermined binary value, and the flow time counter circuit will begin counting incrementally from its present count. However, if the DETECT* signal does not become active before the reset counter circuit decrements to zero, then the DRIVE signal will remain inactive, the clock circuit will stop operating, and the flow time counter circuit will be reset to zero; in other words the timing circuit will return to its initial state. Thus, the reset counter circuit serves to provide a predetermined time period during which the user is allowed to remove him or her self from the range of a detector, thereby stopping fluid flow, while still ensuring that the user will be supplied with his or her allotted time of fluid flow, which is maintained by the flow time counter circuit. The reset counter circuit also serves to provide a definite time period during which the timing circuit resets itself before another user is supplied with his or her allotted time of fluid flow.

From the above descriptive summary it is thus apparent how the present invention timing circuit overcomes the shortcomings of the above-mentioned prior art devices.

Accordingly, the primary objective of the present invention is to provide a simple, low cost, reliable, and highly accurate timing circuit that can be used to control the flow of fluid according to a specific time period that is allotted for each user.

Other objectives and advantages of the present invention will be become apparent to those skilled in the art upon reading the following detailed description and claims, in conjunction with the accompanying drawing which is appended hereto.

BRIEF DESCRIPTION OF THE DRAWING

In order to facilitate a fuller understanding of the present invention, reference is now be made to the appended drawing. The drawing should not be construed as limiting the present invention, but is intended to be exemplary only.

PREFERRED EMBODIMENT OF THE PRESENT INVENTION

Figure 1:
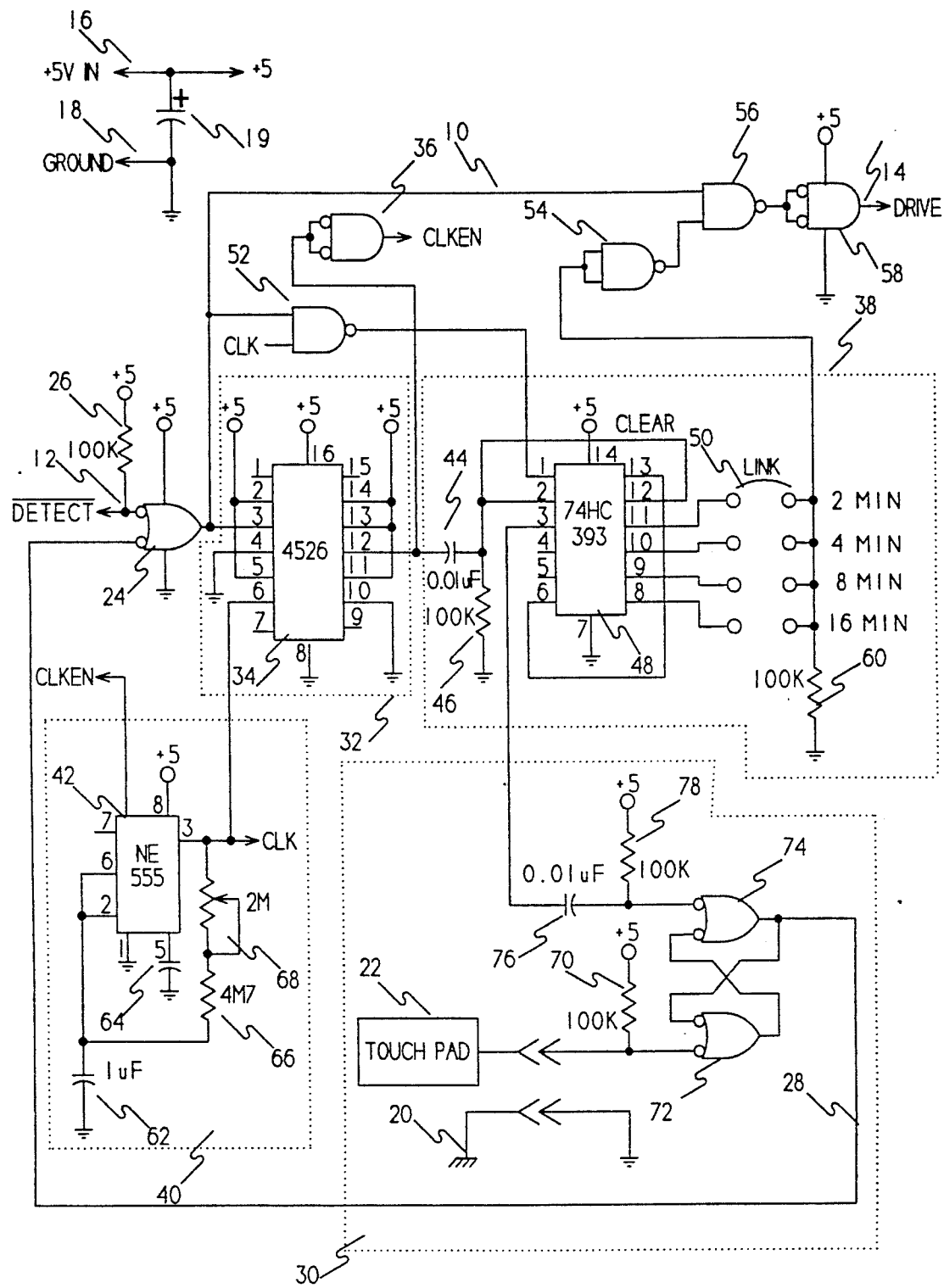
FIG. 1 is a schematic diagram of a preferred embodiment of the present invention timing circuit.

Referring to FIG. 1, there is shown a schematic diagram of the present invention timing circuit 10 having a DETECT* input signal connection 12 and a DRIVE output signal connection 14. The DETECT* input signal connection 12 is provided to indicate the presence of a user, and is generally connected to some sort of detector circuit. The DRIVE output signal connection 14 is provided to indicate when fluid shall be permitted to flow, and is generally connected to a solenoid drive circuit which controls some sort of fluid flow valve.

Also shown in FIG. 1, is a +5 V power input (+5 V) connection 16, a system ground (GND) connection 18, and an earth ground (EARTH) connection 20. The EARTH connection 20 is required if a touch pad 22 is to be used with the timing circuit 10. Otherwise, the timing circuit 10 may be used with a pushbutton, or similar electrical short circuiting device, (not shown) that is connected to GND 18. A decoupling capacitor 19 is electrically connected between the +5 V connection 16 and the GND connection 18 to filter out any timing circuit 10 noise.

The DETECT* input signal connection 12 is electrically connected to a negative input logical NOR gate 24 and a pullup resistor 26. Also electrically connected to the negative input logical NOR gate 24 is an output connection 28 of an initialization circuit 30. Assuming for now that the output state of the initialization circuit 30 is inactive (logical "1") and the DETECT* input signal is active (logical "0"), the negative input logical NOR gate 24 provides an active (logical "1") preload signal to a reset binary-down counter circuit 32.

The reset binary-down counter circuit 32 is essentially comprised of a commercially available 4526 binary-down counter device 34 that may be configured to accept one of a variety of preload values. FIG. 1 shows the 4526 device 34 configured to accept a preload value of 15 decimal.

Upon receiving the active preload signal, the reset binary-down counter circuit 32 provides a logical "0" output signal to both inputs of a negative input logical NAND gate 36 and to a flow time binary-up counter circuit 38. The negative input logical NAND gate 36 merely acts as a logic invertor and provides an active (logical "1") clock enable signal (CLKEN) to a clock circuit 40. In turn, the clock circuit 40 provides a system clock signal (CLK) that is used throughout the timing circuit 10. The clock circuit 40 is essentially comprised of a commercially available 555 timer device 42 that may be configured to provide a CLK signal at one of a variety of frequencies. FIG. 1 shows the 555 timer device 42 configured to provide a CLK signal at a frequency of approximately 0.125 Hz. A pair of capacitors 62,64 and a pair of resistors 66,68 are used in the configuration of the 555 timer device 42.

The flow time binary-up counter circuit 38 accepts the logical "0" output signal from the reset binary-down counter circuit 32 and passes it through an RC filter comprised of a capacitor 44 and a resistor 46. The RC filter, as will be described shortly, acts to create a logical "1" reset pulse from a reset binary-down counter circuit 32 logical "0" to logical "1" transition. When the output signal from the reset binary-down counter circuit 32 transitions from a logical "1" to a logical "0" however the input to the flow time binary-up counter circuit 38 remains at ground level, held there by an internal diode in a commercially available 74HC393 dual, four stage binary counter device 48 as will be now described.

The remainder of the flow time binary-up counter circuit 38 is essentially comprised of the 74HC393 device 48 and a user configurable shorting link 50 that dictates a maximum flow time period, or a maximum time period during which the DRIVE output signal may be active (logical "1") for each particular user. Thus, once the clock circuit 40 begins to provide a CLK signal, the binary counter device 48 begins to incrementally count toward the maximum flow time period. Of course, the CLK signal is logically inverted once it reaches the binary counter device 48 since it is qualified with the active preload signal from the negative input logical NOR gate 24 as it is passed through a logical NAND gate 52, thereby ensuring that the maximum flow time period is properly allotted for each user.

Regardless of the position of the shorting link 50, the binary counter device 48 provides a first unqualified active (logical "0") drive signal to both inputs of a logical NAND gate 54 before the maximum flow time period has been reached. On the other hand, once the maximum flow time period has been reached, the binary counter device 48 provides a first unqualified inactive (logical "1") drive signal to both inputs of the logical NAND gate 54. The logical NAND gate 54 merely acts as a logic inverter and provides a second unqualified active (logical "1") drive signal to a qualifying logical NAND gate 56. This qualifying logical NAND gate 56 accepts the second unqualified active drive signal along with the active preload signal from the negative input logical NOR gate 24 and, along with a negative input logical NAND gate 58, provides the active DRIVE signal. It should be noted that if the shorting link 50 is omitted, then both inputs of the logical NAND gate 54 will be provided with a constant unqualified active drive signal due to the presence of a pulldown resistor 60, and thus there will be no time limit to the flow of fluid.

Thus far the timing circuit 10 has been described with the initialization circuit 30 being held in the inactive (logical "1") output state. However, if the user desires to have an initial controlled time period of fluid flow without having the DETECT* input signal active, then the user must manually invoke the initialization circuit 30. The initialization circuit 30 is manually invoked by the user touching the touch pad 22, which is electrically connected to a pullup resistor 70 and a first negative input logical NOR gate 72. A second negative input logical NOR gate 74 is also present in the initialization circuit 30, thereby forming a set-reset (S-R) flip flop with the touch pad 22 providing an active (logical "0") set input signal. A reset input signal to the S-R flip flop is provided by the flow time binary-up counter circuit 38, through an RC differentiator comprised of a capacitor 76 and a resistor 78 to ensure that only an active (logical "0") reset input pulse reaches the second negative input logical NOR gate 74.

Once the user has invoked the initialization circuit 30, the reset binary-down counter circuit 32, the clock circuit 40, and the flow time binary-up counter circuit 38 all operate as though a user has been detected, or the DETECT* input signal is active. Thus, the DRIVE output signal will become active, thereby permitting an initial controlled time period of fluid flow. The initial controlled time period of fluid flow is limited, however, by the reset input signal from the flow time binary-up counter circuit 38. This reset input signal is generated from one of the counter outputs of the 74HC393 dual, four stage binary counter device 48, and thus the initial controlled time period is configurable according to which counter output is selected. FIG. 1 shows the timing circuit 10 configured to provide an initial controlled time period of approximately 24 seconds.

After the initial controlled time period has elapsed, the reset binary-down counter circuit 32 will count down from its preload value. During this counting down period, hereinafter referred to as a system reset time, the flow time binary-up counter circuit 38 ceases counting and the timing circuit 10 ceases to provide an active DRIVE output signal. When the reset binary-down counter circuit 32 reaches a count of zero, the flow time binary-up counter circuit 38 is reset, the clock circuit 40 is disabled, and the timing circuit 10 enters an initial state.

The system reset time can be avoided, however, if the DETECT* input signal becomes active before the initial controlled time period has elapsed. If such is the case, the flow time binary-up counter circuit 38 continues to count toward the maximum flow time period and the DRIVE output signal remains active until the maximum flow time period has elapsed. It should be noted, however, that the DETECT* input signal, and hence the DRIVE output signal, need not stay active for the entire maximum flow time period for a user to be ensured of receiving his or her allotted time of fluid flow. Such is allowed since the flow time binary-up counter circuit 38 ceases counting whenever the DETECT* input signal becomes inactive, thereby maintaining its present count. It should also be noted, however, that the DETECT* input signal must not remain inactive for a period longer than the system reset time or the flow time binary-up counter circuit 38 will be reset, the clock circuit 40 will be disabled, and the timing circuit 10 will enter the initial state.

From the foregoing description it can be deduced that the reason for including the reset binary-down counter circuit 32 in the timing circuit 10 is threefold. First, the reset binary-down counter circuit 32 provides a definite time period, the system reset time, during which the timing circuit 10 resets itself after one user has received his or her allotted time of fluid flow and before a subsequent user begins to receivehis or her allotted time of fluid flow. Second, the reset binary-down counter circuit 32 allows the user to remove him or her self from being detected, this placing the DETECT* input signal in an inactive state and subsequently inactivating the DRIVE output signal, for certain periods of time without forfeiting any of his or her allotted maximum flow time period. Third, the reset binary-down counter circuit 32 allows the timing circuit 10 to reset itself before the maximum flow time period has elapsed, which is desirable since the maximum flow time period is usually much greater than the system reset time. Furthermore, it can be deduced from the foregoing description and the above-described prior art that the reset binary-down counter circuit 32 is a novel concept when incorporated along with the initialization circuit 30, the flow time binary-up counter circuit 38, and the clock circuit 40 into the present invention timing circuit 10.

At this time it should be noted that although the timing circuit 10 was described above using standard integrated circuits, a similar timing circuit providing similar functions can be implemented using a microprocessor, a microcontroller, a gate array, or a specially designed integrated circuit. However, it is believed that the use of standard integrated circuits will result in an overall lower system cost. Furthermore, it is also possible that the timing circuit 10 be powered at a voltage other than the previously described +5 V, specifically from +3 V to +15 V, since many of the standard integrated circuits used above, or other similar devices, are commercially available to operate at such other voltages.

With the present invention timing circuit 10 now fully described it can thus be seen that the primary objective set forth above is efficiently attained and, since certain changes may be made in the above described circuit without departing from the scope of the invention, it is intended that all matter contained in the above description or shown in the accompanying drawing shall be interpreted as illustrative and not in a limiting sense.

What is claimed is:

1. An electronic timing circuit that can be used to control the flow of fluid according to a specific time period that is allotted for each of a number of users, said electronic timing circuit comprising:
   a clock circuit-responsive to a clock enable signal, for providing a system clock signal;
   a reset counter circuit responsive to said system clock signal and detect input signal, for providing said clock circuit enable signal and a flow time counter circuit reset signal; and
   a flow time counter circuit responsive to said system clock signal and said flow time counter circuit reset signal, for providing a drive output signal, wherein said flow time counter circuit dictates a maximum flow time period during which said drive output signal may remain active, and wherein said reset counter circuit dictates a system reset time during which said electronic timing circuit may reset itself after being used by one of said number of users but prior to subsequent use by another of said number of users or during which said flow time counter circuit may maintain a flow time count to ensure that each of said number of users is provided with said maximum flow time period.

2. The electronic timing circuit as defined in claim 1, wherein said flow time counter circuit further provides an initialization circuit reset signal, and wherein said electronic timing circuit further comprises:
   an initialization circuit responsive to said initialization circuit reset signal and a manually invoked set signal, for providing an initial controlled time period signal, such that each of said number of users may be provided with an initial controlled time period of fluid flow.

3. The electronic timing circuit as defined in claim 2, wherein said manually invoked set signal is provided by a touch pad that is accessible to each of said number of users.

4. The electronic timing circuit as defined in claim 1, wherein said detect input signal is provided by a detector to indicate the presence of a user.

5. The electronic timing circuit as defined in claim 1, wherein said drive output signal is provided to indicate when fluid shall be permitted to flow.

6. The electronic timing circuit as defined in claim 1, wherein said clock circuit is configured to operate as a free running oscillator.

7. The electronic timing circuit as defined in claim 6, wherein said clock circuit is implemented with a standard integrated circuit and discrete components, and wherein said standard integrated circuit is a 555 timer device.

8. The electronic timing circuit as defined in claim 1, wherein said reset counter circuit is configured to operate as a binary-down counter.

9. The electronic timing circuit as defined in claim 8, wherein said reset counter circuit is implemented with a standard integrated circuit, and wherein said standard integrated circuit is a 4526 down-counter device.

10. The electronic timing circuit as defined in claim 1, wherein said flow time counter circuit is user configurable to select said maximum flow time period.

11. The electronic timing circuit as defined in claim 10, wherein said flow time counter circuit is configured to operate as a binary-up counter.

12. The electronic timing circuit as defined in claim 11, wherein said flow time counter circuit is implemented with a standard integrated circuit and discrete components, and wherein said standard integrated circuit is a 393 dual, four stage binary counter device.

13. The electronic timing circuit as defined in claim 1, wherein said initialization circuit is configured as a set-reset flip flop.

14. The electronic timing circuit as defined in claim 13, wherein said initialization circuit is implemented with standard integrated circuits and discrete components, and wherein said standard integrated circuits are positive input logical NAND gates or negative input logical NOR gates.

15. The electronic timing circuit as defined in claim 1, wherein said electronic timing circuit operates from a +5 volt power supply connection.

16. The electronic timing circuit as defined in claim 1, wherein said electronic timing circuit operates over the range of +3 volts to +15 volts.

17. The electronic timing circuit as defined in claim 1, wherein said electronic timing circuit may be implemented using a microprocessor or a microcontroller.

18. The electronic timing circuit as defined in claim 1, wherein said electronic timing circuit may be implemented using a gate array or an application specific integrated circuit.

* * * * *